US006911983B2

(12) United States Patent
Sabella et al.

(10) Patent No.: US 6,911,983 B2
(45) Date of Patent: Jun. 28, 2005

(54) DOUBLE-BUFFERING OF PIXEL DATA USING COPY-ON-WRITE SEMANTICS

(75) Inventors: Paolo E. Sabella, Dublin, CA (US); Nicholas P. Witt, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 137 days.

(21) Appl. No.: 10/388,112

(22) Filed: Mar. 12, 2003

(65) Prior Publication Data

US 2004/0179019 A1 Sep. 16, 2004

(51) Int. Cl.[7] .............................................. G06F 13/00
(52) U.S. Cl. ...................... 345/536; 345/503; 345/520; 345/531; 345/545; 345/539
(58) Field of Search ................. 345/503, 519, 345/520, 531, 536, 539, 543, 545, 559, 562

(56) References Cited

U.S. PATENT DOCUMENTS

| 5,742,788 | A | | 4/1998 | Priem et al. |
| 5,801,717 | A | * | 9/1998 | Engstrom et al. ........... 345/539 |
| 5,844,569 | A | * | 12/1998 | Eisler et al. ................ 345/619 |
| 6,075,543 | A | * | 6/2000 | Akeley ....................... 345/539 |
| 6,396,473 | B1 | * | 5/2002 | Callahan et al. ............ 345/530 |
| 6,538,650 | B1 | | 3/2003 | Prasoonkumar et al. |
| 6,587,112 | B1 | * | 7/2003 | Goeltzenleuchter et al. 345/532 |
| 6,697,063 | B1 | * | 2/2004 | Zhu ............................ 345/421 |
| 2002/0085013 | A1 | * | 7/2002 | Lippincott .................. 345/572 |
| 2003/0058221 | A1 | * | 3/2003 | Tucker et al. ............... 345/163 |
| 2003/0071818 | A1 | * | 4/2003 | Wilt et al. ................... 345/537 |

OTHER PUBLICATIONS

Tanenbaum, Andrew S., *Modern Operating Systems*, 2nd Ed., Prentice Hall, New Jersey, 2001, 5 pages.

* cited by examiner

*Primary Examiner*—Ulka J. Chauhan
(74) *Attorney, Agent, or Firm*—Townsend and Townsend and Crew, LLP

(57) ABSTRACT

Tile buffers in a graphics processing system are managed use "copy-on-write" semantics, in which tile data stored in a memory location is not transferred to another location until the tile data for one of the buffers is modified. Two memory spaces store tile data, and two logical buffers are used to access the memory spaces. For each tile, a tile association is maintained, indicating which of the two memory spaces is associated with each of the two logical buffers. To copy a tile of the first logical buffer to the second logical buffer, the tile association for the tile being copied is modified. Data for a tile is written to the memory space associated with a target logical buffer after ensuring that the tile association for the tile associates the target logical buffer with a different one of the two memory spaces from the other logical buffer.

33 Claims, 5 Drawing Sheets

DOUBLE-BUFFERING OF PIXEL DATA USING COPY-ON-WRITE SEMANTICS

CROSS-REFERENCES TO RELATED APPLICATIONS

The present disclosure is related to co-pending U.S. patent application Ser. No. 10/388,267, filed on the same date as the present application, entitled "Desktop Compositor Using Copy-on-Write Semantics," which disclosure is incorporated herein by reference for all purposes.

BACKGROUND OF THE INVENTION

The present invention relates in general to computer image processing and in particular to systems and methods for providing double-buffering for image data using copy-on-write semantics.

Computer display devices typically display images by coloring each of a number of independent pixels (picture elements) that cover the display area. The computer system determines a color value for each pixel using various well-known graphics processing techniques. Once color values are generated, pixel data representing the color values is written to a "frame buffer," an area of memory with sufficient capacity to store color data for each pixel of the display device. To display an image, scanout control logic reads the pixel values sequentially from the frame buffer and converts them to analog signals that produce the desired pixel colors on the display device. Scanout is generally performed at a constant frame rate, e.g., 80 Hz.

The demand for access to the frame buffer memory can be quite large. For instance, scanout at 80 Hz for a 1024×768 pixel display with 32-bit color requires the ability to read 2 Gbits per second. At the same time, data for the next frame is also being written to the frame buffer, often at high rates. Thus, memory bandwidth is generally a scarce resource in image processing systems.

To improve memory access times and to prevent undesirable visual artifacts that can result if pixel data in the frame buffer is updated during scanout of a frame, many graphics processing systems (or other image generation systems) provide a double-buffered frame buffer, as shown in FIG. 1. Frame buffer 100 includes two memory spaces 102, 104, each of which has sufficient capacity to store pixel data for a complete display frame. At a given time, one memory space (e.g., space 102) is designated as the "back" buffer while the other (e.g., space 104) is designated as the "front" buffer. Applications 106, 108 write pixel data to respective sections 110, 112 of the back buffer (memory space 102) while the front buffer (memory space 104) is read and displayed by scanout control logic 114. Memory spaces 102, 104 are generally designed to be accessed in parallel, to reduce conflicts between updating and scanout operations. At the end of each scanout frame, the buffers are swapped, i.e., the memory space 102 designated as the front buffer becomes the back buffer and vice versa. The next frame is written to the new back buffer (e.g., memory space 104) while the new front buffer (memory space 102) is scanned out.

To avoid writing an entire frame to the back buffer during each scanout pass, some existing systems also copy the content of the back buffer to the front buffer at the time of swapping, so that the back buffer can be updated rather than being completely rewritten. That is, at the end of a scanout frame, data from the back buffer (memory space 102) is copied (e.g., by a block transfer) to the front buffer (memory space 104). Memory references (e.g., pointers or base addresses) used by applications 106, 108 and scanout control logic 114 are typically swapped at this point so that during the next scanout pass, the memory space 102 that was used as the back buffer is scanned out while the other memory space 104 receives pixel data updates. This procedure can reduce demand for write access during the frame interval, but the peak demand for memory bandwidth can be quite high due to the need to copy an entire frame of pixel data at the end of each frame.

It is often the case that some or all of the pixel values do not change during a particular frame interval. Nevertheless, at the end of the frame, data for every pixel is copied, regardless of whether a particular pixel value was updated or not. The copying of unmodified pixel data results in a waste of memory bandwidth.

This problem can be compounded in proposed desktop compositor systems. In general, such systems differ from the system of FIG. 1 in that pixel data generated by applications or other data sources is not written directly to the frame buffer. Instead, for each application, a dedicated area of "drawing" memory is provided as a buffer for storing pixel data generated by that application. A desktop compositor combines data from the drawing memories of various applications to generate a desktop pixel value, which is stored in a desktop frame buffer. The desktop frame buffer is then scanned out to produce the display image. The drawing memories can be double-buffered, with applications writing to a "back" drawing buffer and the desktop compositor reading from a "front" drawing buffer. Likewise, the desktop frame buffer can also be double-buffered, with the desktop compositor writing to a "back" desktop buffer and the scanout control logic reading from a "front" desktop buffer. Such systems are desirable because visual effects such as transparent or translucent windows are more easily implemented. In addition, providing each application with a separate drawing memory reduces contention among applications for write access to the frame buffer.

Such systems, however, do not reduce the copying of unmodified pixel data between the various buffers. In implementations where application data is copied between two drawing buffers to support incremental updating of the application image, the amount of data that has to be moved can become prohibitive.

It would therefore be desirable to provide a double-buffering system that avoided copying of unmodified pixel data, thereby reducing the demand for memory bandwidth.

BRIEF SUMMARY OF THE INVENTION

Embodiments of the present invention provide memory management systems and methods for pixel data buffers in a graphics processing system using "copy-on-write" semantics. The display area is segmented into a number of tiles, where each tile includes one or more pixels, and pixel data for a particular tile is transferred from one location in memory to another only when the data is to be modified. To the extent that tiles are not modified during a frame interval, the need to transfer tile data between memory locations is reduced, thereby decreasing the demand for memory bandwidth.

According to one aspect of the invention, a buffer system for storing tile data for tiles of a display includes a first memory space for storing tile data; a second memory space for storing tile data; a memory interface circuit; and a tile table. The memory interface circuit is configured to receive memory access commands referencing a first logical buffer and a second logical buffer, and the memory interface circuit is further configured to respond to the memory access commands by accessing the first and second memory spaces. The tile table configured to store an entry for each of a plurality of tiles, each entry associating each of the first logical buffer and the second logical buffer with one of the first and second memory spaces. The memory interface circuit uses the tile table entries to determine and modify associations of tiles of the first and second logical buffers with the first and second memory spaces.

According to another aspect of the invention, a method is provided for managing graphics data for a plurality of tiles of a display. A tile association is established for each of the plurality of tiles. Each tile association indicates which of two memory spaces for storing tile data for that tile is associated with each of a first logical buffer and a second logical buffer, and the two memory spaces are accessible by referencing the first logical buffer and the second logical buffer. A tile of the first logical buffer is copied to the second logical buffer by modifying the tile association for the tile. Updated tile data for a tile of the second logical buffer is written to the one of the two memory spaces associated with the second logical buffer after updating the tile association for the tile so that the first and second logical buffers are associated with different ones of the two memory spaces.

According to yet another aspect of the invention, a method is provided for managing graphics data for a plurality of tiles of a display. A tile association is established for each of the plurality of tiles. Each tile association indicates which of two memory spaces for storing tile data for that tile is associated with each of a first logical buffer and a second logical buffer, and the two memory spaces are accessible by referencing the first logical buffer and the second logical buffer. Data for each tile of a first display image is scanned out from the one of the two memory spaces associated with the first logical buffer. In parallel with the act of scanning out data, updated tile data for a tile of a second display image is written to the one of the two memory spaces associated with the second logical buffer after updating the tile association for the tile so that the first and second logical buffers are associated with different ones of the two memory spaces. Upon completion of the act of scanning out data, each tile of the second logical buffer is copied to the first logical buffer by updating the tile associations.

According to a further aspect of the invention, a memory system for managing data for a plurality of tiles includes drawing memories, a desktop compositor module, and a desktop frame memory subsystem. Each drawing memory is configured to receive source tile data for a plurality of tiles from a data source and to store the source tile data in one of a first and a second drawing buffer. The desktop compositor module is configured to read source tile data by accessing selected first drawing buffers of the drawing memories and to generate desktop tile data from the source tile data. The desktop frame memory subsystem, which is configured to store desktop tile data received from the desktop compositor module, includes a first memory space for storing tile data; a second memory space for storing tile data; a memory interface circuit; and a tile table. The memory interface circuit is configured to receive memory access commands referencing a first desktop buffer and a second desktop buffer, and the memory interface circuit is further configured to respond to the memory access commands by accessing the first and second memory spaces. The tile table is configured to store an entry for each of a plurality of tiles, each entry associating each of the first desktop buffer and the second desktop buffer with one of the first and second memory spaces. The memory interface circuit uses the tile table entries to determine and modify associations of tiles of the first and second desktop buffers with the first and second memory spaces.

The following detailed description together with the accompanying drawings will provide a better understanding of the nature and advantages of the present invention.

DETAILED DESCRIPTION OF THE INVENTION

Embodiments of the present invention provide memory management systems and methods for pixel data buffers in a graphics processing system using "copy-on-write" semantics. The display area is segmented into a number of tiles, where each tile includes one or more pixels, and pixel data for a particular tile is transferred from one location in memory to another only when the data is to be modified. To the extent that tiles are not modified during a frame interval, the need to transfer tile data between memory locations is reduced, thereby decreasing the demand for memory bandwidth.

Figure 1:
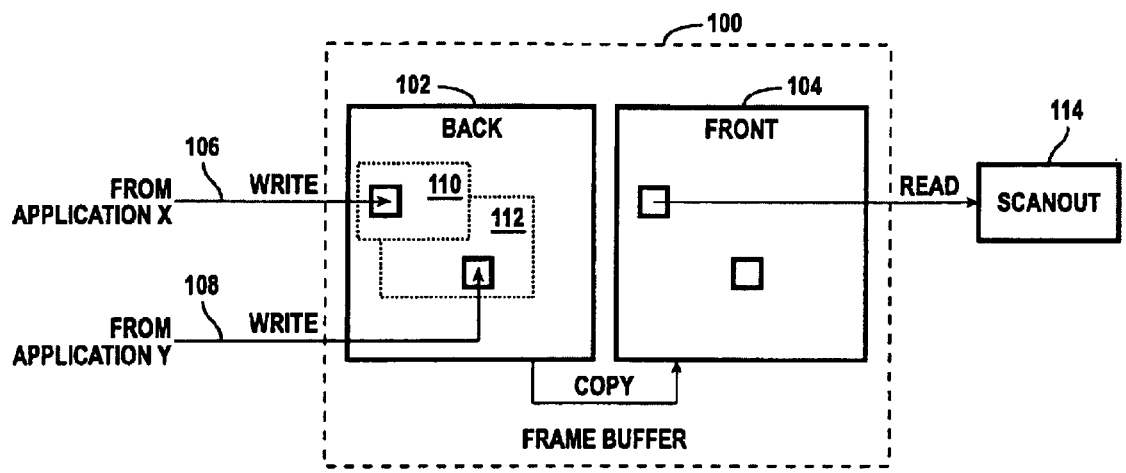
FIG. 1 is a block diagram of a conventional double-buffered frame buffer.
Figure 2:
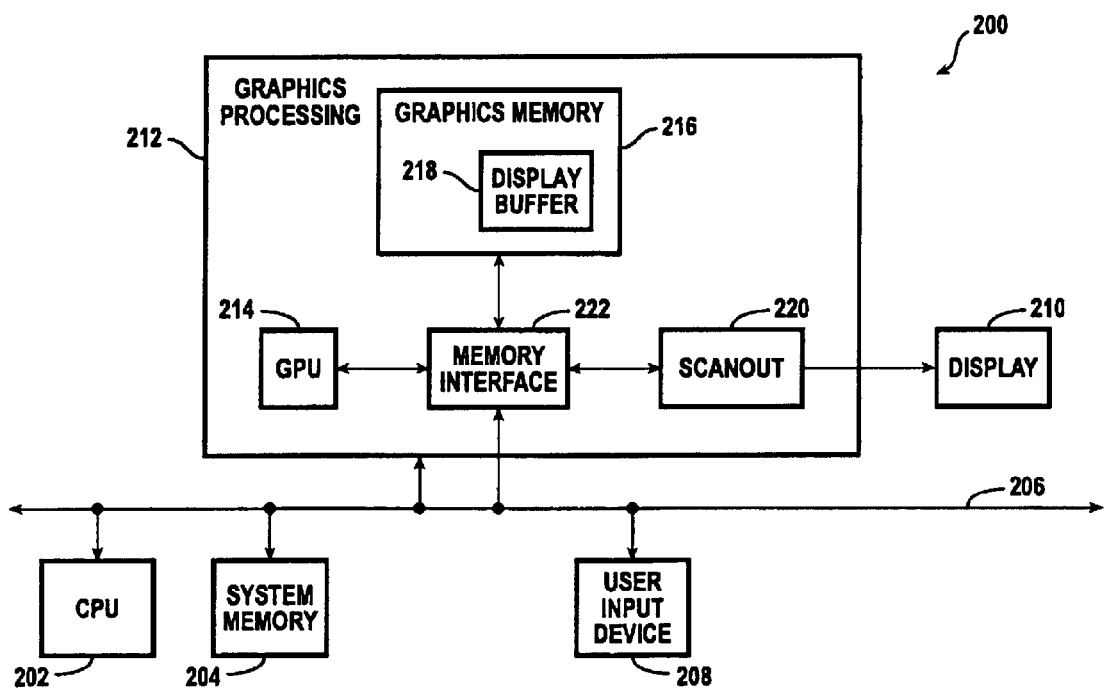
FIG. 2 is a block diagram of a computer system according to an embodiment of the present invention.

FIG. 2 is a block diagram of a computer system 200 suitable for implementing the present invention. Computer system 200 includes a central processing unit (CPU) 202 and a system memory 204 communicating via a system bus 206. User input is received from one or more user input devices 208 (e.g., keyboard, mouse) coupled to system bus 206. Visual output is provided on a display device 210 (e.g., a conventional CRT- or LCD-based monitor) operating under control of a graphics processing subsystem 212 coupled to system bus 206. Graphics processing subsystem 212 includes a graphics processing unit (GPU) 214, a graphics memory 216 including a double-buffered display buffer 218, and scanout control logic 220. GPU 214 and scanout control logic 220 access display buffer 218 through a display memory interface 222, which may also control access to other areas of graphics memory 216. Display memory interface 222 may be coupled to system bus 206 to allow communication between CPU 202 and display buffer 218; alternatively, CPU 202 may communicate with display memory interface 222 via GPU 214.

In operation, CPU 202 executes one or more application programs, which generate image data. This data is provided via the system bus to the graphics processing subsystem. Some applications may generate pixel data and provide it to display buffer 218. Other applications may generate image data in the form of geometric representations that GPU 214 converts to pixel data. Any technique for generating pixel data may be used; a number of such techniques are known in the art. Regardless of how it is generated, pixel data is stored in display buffer 218 via memory interface 222. In accordance with the present invention, memory interface 222 manages data storage in display buffer 218 using copy-on-write semantics, as will be described below. In some embodiments, memory interface 222 also performs additional tasks, such as optimizing use of available memory bandwidth (e.g., by prioritizing memory access requests).

Data in display buffer 218 is read out via memory interface 222 by scanout control logic 220, which generates control signals for the display device. In one embodiment, scanout control logic 220 reads the display buffer and refreshes the display at a constant frame rate (e.g., 80 Hz); the frame rate can be a user-selectable parameter. Scanout control logic 220 may include various operations such as digital-to-analog conversion, generating composite images using the pixel data from display buffer 218 and other pixel data sources (not shown) such as a video overlay image or a cursor overlay image, and the like. Such operations are known in the art.

It will be appreciated that FIG. 2 is illustrative and that modifications are possible. For instance, a separate GPU is not required; all pixel data can be supplied directly from the CPU or other system components. The display device can be any pixel-based display device. In view of the present disclosure, one of ordinary skill in the art will recognize that a wide variety of system configurations can be used for practicing the present invention.

In accordance with an embodiment of the present invention, display buffer 218 provides double-buffering of pixel data and is managed by memory interface 222 using copy-on-write semantics. For memory management purposes, the display frame is segmented into a number (N) of non-overlapping tiles, where each tile includes one or more pixels. Data for a tile is copied from one buffer to the other when some or all of the pixels in the tile are to be updated. Tiles can be of any size, and tile size can advantageously be selected based on properties of graphics memory 216, such as memory transaction size; for instance, if graphics memory 216 can transfer data for 32 pixels in one transaction, a tile size of 4×8 pixels can be selected.

Figure 3:
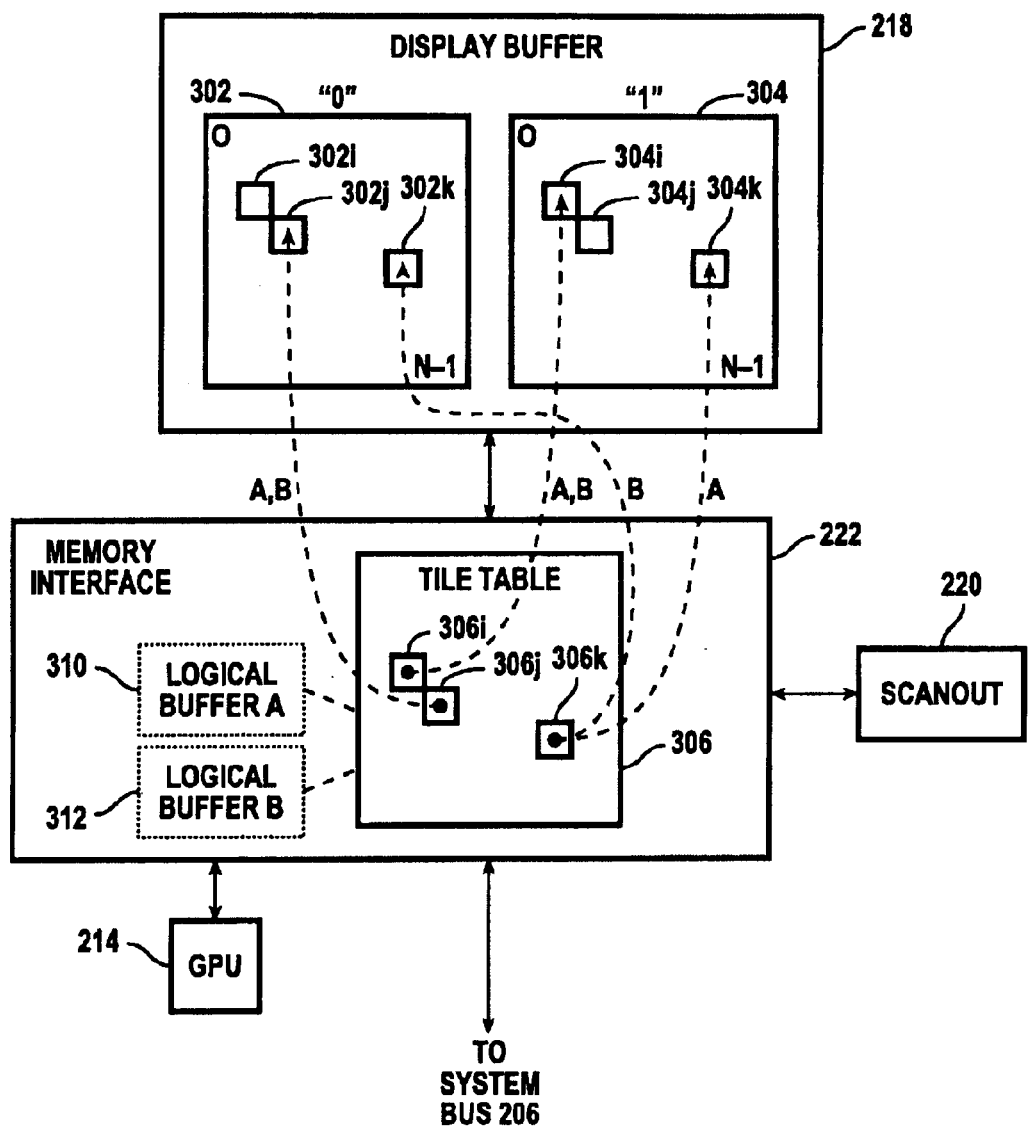
FIG. 3 is a block diagram of a double-buffered frame buffer according to an embodiment of the present invention.

FIG. 3 is a block diagram of memory interface 222 and display buffer 218 in accordance with an embodiment of the present invention. In this embodiment, display buffer 218 includes two physical memory spaces 302, 304, each of which can store tile data for all N tiles (numbered 0, 1, . . . , N−1) of the display. Data for tile i can be stored in either of two locations: location 302$i$ or location 304$i$.

Rather than directly referencing one of memory spaces 302, 304, the data-writing and scanout processes access display buffer 218 by reference to two logical buffers, denoted herein as "A" and "B" and represented by dotted boxes 310, 312 in FIG. 3. As will be apparent in view of the present disclosure, logical buffers A and B do not store tile data and need not be implemented as memory structures. At any given time, one of the two logical buffers (e.g., buffer A) is used for writing pixel data while the other (e.g., buffer B) is used for reading pixel data. Memory interface 222 associates each of the two logical buffers with one of the memory spaces 302, 304, and the associations are made and updated on a tile-by-tile basis. Upon receiving a memory access command referencing a tile of one of the logical buffers, memory interface 222 determines which of the two memory spaces 302, 304 is associated with that tile of the referenced logical buffer and accesses the appropriate memory space to execute the command. For instance, logical buffers A and B can be implemented using address generating circuitry that receives a reference to a tile of one of the two logical buffers (e.g., to tile i of logical buffer A) and generates the address of the memory location in display buffer 218 that is associated with the tile (e.g., location 304$i$).

To maintain the associations of the logical buffers A and B with the memory spaces 302, 304 on a tile-by-tile basis, memory interface 222 advantageously uses a tile table 306. Tile table 306 includes an entry (e.g., entries 306$i$, 306$j$, 306$k$) for each of the N tiles; the entry provides enough information to determine which of the two memory spaces 302, 304 each logical buffer is associated with. It should be noted that the association (or mapping) is defined independently for each tile and that for any given tile the two logical buffers can be associated with the same memory location or with different memory locations. For instance, the dashed arrows in FIG. 3 illustrate some possible associations: tile table entry 306$i$ indicates that, for tile i, buffers A and B are both associated with location 304$i$; tile table entry 306$j$ indicates that, for tile j, buffers A and B are both associated with location 302$j$; and tile table entry 306$k$ indicates that, for tile k, buffer A is associated with location 304$k$ while buffer B is associated with location 302$k$. Tile table 306 can be implemented in any manner that unambiguously associates each of logical buffers A and B with a location in one of the two tile memories on a tile-by-tile basis. Some specific embodiments of tile table 306 are described below.

It will be appreciated that the memory configuration described herein is illustrative and that modifications are possible. Memory spaces 302, 304 can be implemented using one or more video memory (VMEM) devices or other suitable memory technologies. Memory spaces 302, 304 are not required to be physically adjacent to each other or even on the same chip, nor is either of memory spaces 302 or 304 required to be implemented as a single contiguous area of memory. The location and configuration of memory spaces 302, 304 can be selected based on efficiency, space requirements, or other design considerations. The number of tiles N can be varied as desired; the size of a tile can be as small as one pixel or as large as desired.

Tile table 306 can be implemented outside graphics memory 216, e.g., using a register array located on the same chip as a circuit implementing memory interface 222, or within graphics memory 216. The former option avoids introducing additional demands for memory bandwidth and can further improve memory access times. In addition, tile table 306 can also be implemented using a separate table or array for each logical buffer. It will also be appreciated that use of a tile table is not required: tile associations can be provided by any technique that unambiguously associates each logical buffer with a memory location on a tile-by-tile basis and allows for modification of the associations for individual tiles.

Memory interface 222 uses logical buffers A and B and tile table 306 to manage memory spaces 302, 304 using "copy-on-write" semantics. The term "copy-on-write" denotes that copying of tile data occurs only when the tile data is actually modified. A command to copy tile data for a tile of a source buffer (e.g., buffer B) to a target buffer (e.g., buffer A) is executed by modifying the associations of the buffers (e.g., a tile table entry) without transferring any tile data from one memory location to another. A command to write data for a tile to a target buffer (e.g., buffer A) is executed by first ensuring that the target buffer and the other buffer (e.g., buffer B) are associated with different memory locations—which may require modifying the associations of the buffers (e.g., a tile table entry) and transferring tile data from one memory location to another—and then writing the new tile data. A command to read data for a tile from a source buffer (e.g., buffer B) is executed by identifying the memory location associated with the source buffer and reading data from that location.

Figure 4:
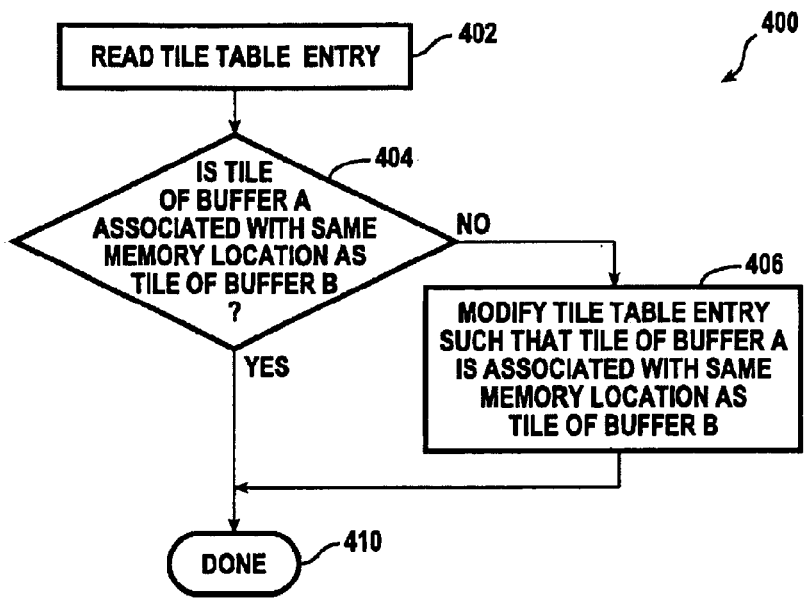
FIG. 4 is a flow chart of a process for copying tile data according to an embodiment of the present invention.

Examples of specific processes used by memory interface 222 to execute copy and write commands in accordance with an embodiment of the present invention will now be described with reference to FIGS. 4 and 5. FIG. 4 illustrates a process 400 for executing a command to copy a tile of buffer B to buffer A. At step 402, the tile table entry corresponding to the tile is read to determine which tile memory location is associated with the tile in each logical buffer. At step 404, it is determined whether the tile is associated with the same memory location for buffer A as it is for buffer B. If not, then at step 406, the tile table entry is modified so that the tile is associated with the same memory location for buffer A as it is for buffer B. For instance, in FIG. 3, tile k of logical buffer A is associated with memory location 304k while tile k of logical buffer B is associated with memory location 302k. At step 406, tile table entry 306k would be modified so that the tile is associated with memory location 302k for both buffers A and B. At step 410, the copy process is done; in some implementations, a "done" message may be sent to the source of the copy command.

It should be noted that process 400 modifies, at most, only a tile table entry, which generally includes a smaller number of bits than the tile data. In addition, if the tile table is implemented using on-chip registers, no memory access is required. In some embodiments, where the overhead associated with modifying a tile table entry is small, the comparison step (step 404) can be omitted; in that case, the tile table entry is always rewritten. It will be appreciated that a similar process can be provided for copying a tile of buffer A to buffer B.

Copying an entire buffer (e.g., copying buffer B to buffer A) can be implemented by applying process 400 to each tile of the buffers. In this case, the copying operation can be performed for any or all of the tiles sequentially, in parallel, or by a block copying operation, depending on the implementation of the tile table or other tile association technique.

Figure 5:
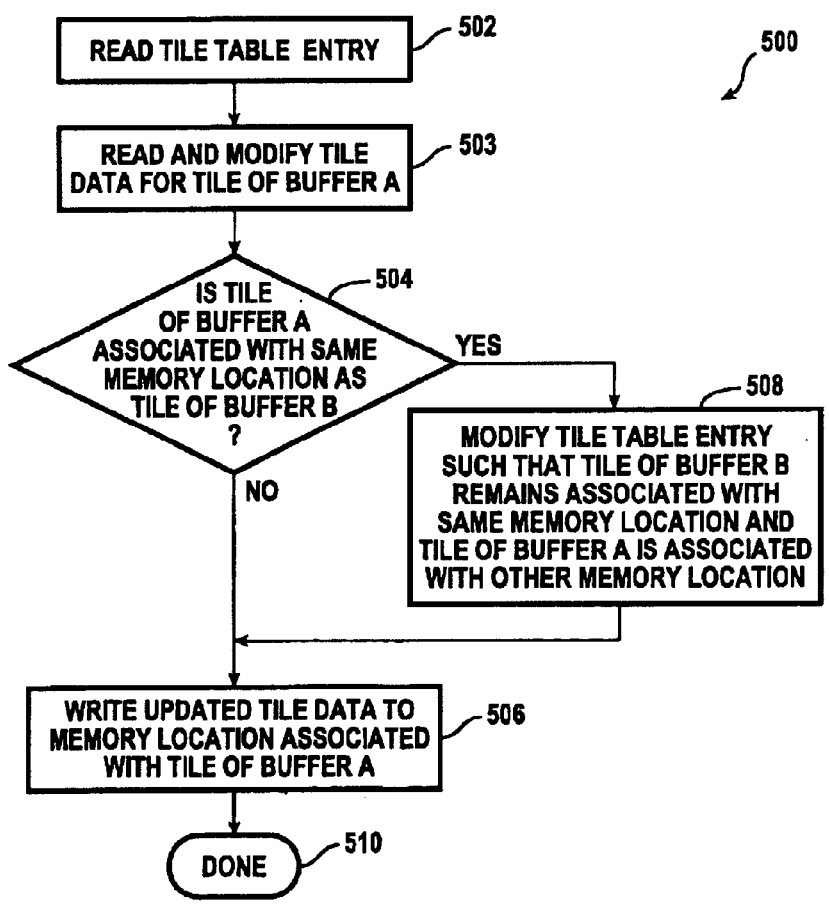
FIG. 5 is a flow chart of a process for writing tile data to a buffer according to an embodiment of the present invention.

FIG. 5 illustrates a process 500 for executing a command to write new tile data to a tile of buffer A in accordance with the present invention. The process involves ensuring that the tile is associated with different memory locations for buffers A and B prior to writing the updated tile data. More specifically, at step 502, the tile table entry corresponding to the tile is read to determine which tile memory location each buffer is associated with. At step 503, the current tile data is read from the tile memory location associated with the tile of buffer A (e.g., into an on-chip register) and updated. Prior to writing the updated tile data back to the memory, it is determined at step 504 whether buffers A and B are associated with the same tile memory location. If not, then writing to the location associated with buffer A will not affect buffer B and data is written to the location associated with buffer A at step 506. At step 510, the write process is done; in some implementations a "done" message may be sent to the source of the write command.

If, however, buffers A and B are associated with the same location, then writing to the location associated with buffer A will also affect buffer B, which is generally not a desired result. To prevent this, at step 508, the tile table entry is modified to associate buffer A with the other available memory location for the tile, while buffer B continues to be associated with the original location. For example, in FIG. 3, for tile i, buffers A and B are both associated with memory location 304i. At step 508, tile table entry 306i would be modified so that buffer B remains associated with location 304i while buffer A is associated with location 302i. At this point, buffers A and B are associated with different memory locations, so that writing to the location associated with buffer A does not affect buffer B. At step 506, the updated tile data is written to the memory location associated with buffer A. It will be appreciated that a similar process can be provided for writing data for a tile to buffer B.

In another embodiment, rather than reading and updating tile data, new tile data for some or all of the pixels in the tile is stored directly to memory. In this embodiment, step 503 is omitted, and step 508 includes copying all pixel data for the tile (e.g., by block transfer) from the memory location associated with buffer B to the memory location associated with buffer A. Copying all of the pixel data for the tile prior to writing the new data at step 506 preserves the original content of the tile so that the new data to be written can include data for fewer than all of the pixels in the tile.

It should be noted that processes 400 and 500 can be implemented within the graphics memory interface, transparent to applications, scanout processes, or any other source of memory access commands. For instance, the graphics memory interface can provide an application with a reference to one of the logical buffers to be used as a "back" display buffer for writing data. The application can issue a conventional write command targeting the buffer; the graphics memory interface executes the write command according to process 500 and returns any appropriate signals to the application. Thus, conventional applications and techniques for generating pixel data can be used with the present invention, as can conventional scanout control logic.

Examples of embodiments of tile table 306 and corresponding implementations of processes 400 and 500 will now be described. In a first embodiment, a tile table entry TT[t] for each tile t includes a first bit P[t] indicating which of the two memory spaces is associated with the tile in logical buffer A, and a second bit Q[t] indicating which of the two memory spaces is associated with the tile in logical buffer B. In other words, if a tile memory location is denoted by Tiles[m][t], where m=0(m=1) denotes the first (second) memory space 302 (304), then tile t of buffer A (denoted by A[t]) is associated with Tiles[P[t]][t] and tile t of buffer B (denoted by B[t]) is associated with Tiles[Q[t]][t]. In this embodiment, for tile i in FIG. 3, P[i]=Q[i]=1; for tile j, P[j]=Q[j]=0; and for tile k, P[k]=1,Q[k]=0.

In accordance with process 400, copying a tile t of buffer B to buffer A can be implemented according to the following pseudocode fragment:

$P[t]=Q[t]$, where the conditional step 404 of process 400 has been omitted since copying a single bit has low overhead. In accordance with process 500, a command to write tile data for tile t to buffer A can be implemented according to the following pseudocode fragment.

```
read(tile data, Tiles[P[t]][t]);
update tile data;
if (P[t] == Q[t]) {
    P[t] = ~P[t];   /* ~ is logical NOT */
```

-continued

```
}
write (tile data, Tiles[P[t]][t]).
```

Pseudocode implementations of corresponding processes for copying a tile from buffer A to buffer B and for writing tile data to buffer B can be obtained by replacing "A" with "B" and "P" with "Q" in the above pseudocode fragments. It is to be understood that the use of pseudocode is for illustrative purposes and that processes 400 and 500 can be implemented in hardware, software, or any combination of the two.

In another embodiment, a tile table entry TT[t] for tile t includes a first bit P[t] indicating which of the two tile memories is associated with the tile in buffer A and a second bit D[t] indicating whether the tile in buffer B[t] is associated with the same tile memory (D[t]=0) or the other tile memory (D[t]=1). In the notation above, buffer location A[t] is associated with Tiles[P[t]][t] and buffer location B[t] is associated with Tiles[P[t]^D[t]][t], where ^ is the logical XOR operator. In this embodiment, for tile i in FIG. 3, P[i]=1, D[i]=0; for tile j, P[j]=0, D[j]=0, and for tile k, P[k]=0, D[k]=1.

In accordance with process 400, copying tile data for tile t from buffer B to buffer A can be implemented according to the following pseudocode fragment:

$P[t]=P[t]^\wedge D[t]$;

$D[t]=0$;

where the conditional step 404 has again been omitted due to the low overhead of these operations. This changes the value of P[t] for a tile t if D[t]=1. Copying tile data for tile t from buffer A to buffer B can be implemented according to the following pseudocode fragment:

$D[t]=0$, where the conditional step 404 has again been omitted.

In accordance with process 500, writing updated tile data for tile t to buffer A can be implemented according to the following pseudocode fragment:

```
read(tile data, Tiles[P[t]][t]);
update tile data;
if (D[t] == 0) {
    P[t] = ~P[t];
    D[t] = 1;
}
write(tile data, Tiles[P[t]][t]),
```

Writing updated tile data for tile t to buffer B can be implemented according to the following pseudocode fragment:

```
read(tile data, Tiles[P[t]^D[t]][t]);
update tile data;
if (D[t] == 0) {
    D[t] = 1;
}
write(tile data, Tiles[P[t]^D[t]][t]).
```

It will be appreciated that these embodiments are illustrative and that other embodiments are possible. For instance, any four-state encoding scheme can be used to associate tiles of buffers A and B with locations in the memory spaces. Four states (S0, S1, S2, S3) can be defined, where S0 denotes that buffers A and B are both associated with memory space 0; S1 denotes that buffer A is associated with memory space 0 and buffer B with memory space 1; S2 denotes that buffer A is associated with memory space 1 and buffer B with memory space 0; and S3 denotes that buffers A and B are both associated with memory space 1. Accordingly, process 400 for copying a tile from buffer B to buffer A can be implemented as:

if (state==S1) {state=S3} else if (state==S2) {state=S0}.

Copying a tile from buffer B to buffer A can be implemented as:

if (state==S1) {state=S0} else if (state==S2) {state=S3}.

Writing tile data for a tile of buffer A can be implemented as:

if (state==S0) {state=S2} else if (state==S3) {state=S1};

write updated tile data to tile of buffer A.

Writing tile data for a tile of buffer B can be implemented as:

if (state==S0) {state=S1} else if (state==S3) {state=S2};

write updated tile data to tile of buffer B.

In other embodiments, the tile table entry may be a pointer (or other reference) to a memory location for the tile or to a base memory location for a tile memory array, with the tile number used to determine a tile-specific offset.

Figure 6:
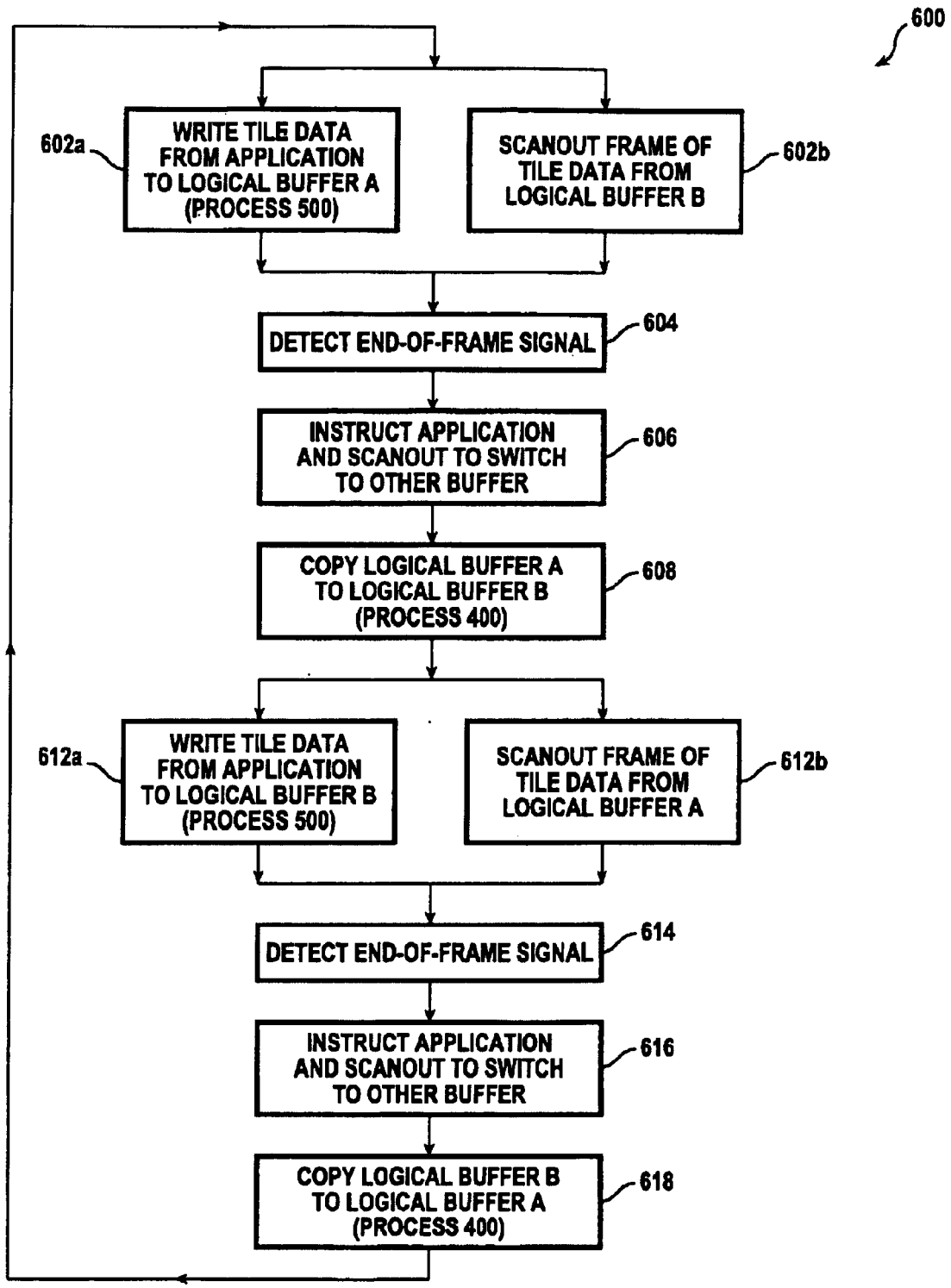
FIG. 6 is a flow chart of a memory management process for a frame buffer according to an embodiment of the present invention.

Processes 400 and 500 can be used to manage a double-buffered display buffer, as illustrated in FIG. 6. In process 600, applications write tile data to one of two logical buffers while the other logical buffer is scanned out; at the end of a scanout frame, the buffer that was updated is copied to the buffer that was scanned out. Copying and writing are performed using copy-on-write semantics as described above.

More specifically, at step 602*a*, one or more applications write tile data to logical buffer A using process 500. In parallel, at step 602*b*, the scanout control logic reads and displays a frame of tile data from logical buffer B. In accordance with process 500, logical buffer A is updated without affecting logical buffer B; thus, the frame currently being displayed is not affected by any changes being made to tile data by applications.

At step 604, an end-of-frame (EOF) signal is detected. In one embodiment, this signal is generated when the scanout control logic has finished reading the frame of tile data from logical buffer B (e.g., at a vertical retrace of a CRT display device). In another embodiment, in order to prevent visible "tearing" in displayed images, the EOF signal is generated when scanout of the current frame is complete and a consistent set of updates has been delivered for the next frame. Generation of such signals can be done using techniques similar to those in conventional double-buffered systems.

At step 606, in response to the EOF signal, the application and the scanout control logic are each instructed to switch to the other buffer. At step 608, logical buffer A is copied to logical buffer B, in accordance with process 400. Thereafter, at step 612*a*, the application writes tile data to logical buffer B in accordance with process 500. In parallel, at step 612*b*, the scanout control logic reads a frame of tile data from logical buffer A. At step 614, an EOF signal is again detected, indicating that the scanout control logic has finished reading the frame of tile data from logical buffer A.

This step can be implemented similarly to step 604. In response, at step 616, the application and the scanout control logic are each instructed to switch to the other buffer. At step 618, logical buffer B is copied to logical buffer A using process 400. Thereafter, the process returns to step 602a, b, and process 600 continues as long as tile data is being displayed.

It should be noted that in process 600, tile data for a given tile is copied from one memory location to the other only when that tile is updated. In some embodiments, only a few tiles change during a typical frame interval; thus, the number of tiles for which data is copied can be small, and memory bandwidth can be substantially reduced as compared to conventional double-buffered frame buffers.

The copy-on-write semantics used in process 600 can be transparent to the applications and the scanout control logic. As described above with regard to processes 400 and 500, an application can issue write commands using a logical buffer reference provided by the graphics memory; the graphics memory interface executes the write command according to process 500 and returns any appropriate signals to the application.

It will be appreciated that process 600 is illustrative and that variations and modifications are possible. For instance, at the end of step 606 (and step 616), logical buffers A and B are identical—i.e., for each tile, both buffers are associated with the same memory location. Thus, it is also possible to implement process 600 such that applications always write to logical buffer A and the scanout control logic always reads from logical buffer B (or vice versa).

The use of copy-on-write semantics to implement double buffering is not limited to frame buffers; the same semantics can be implemented to provide more efficient double buffering of pixel data in other contexts as well. For example, copy-on-write semantics can be applied to any double-buffered memory in a desktop compositor system.

Figure 7:
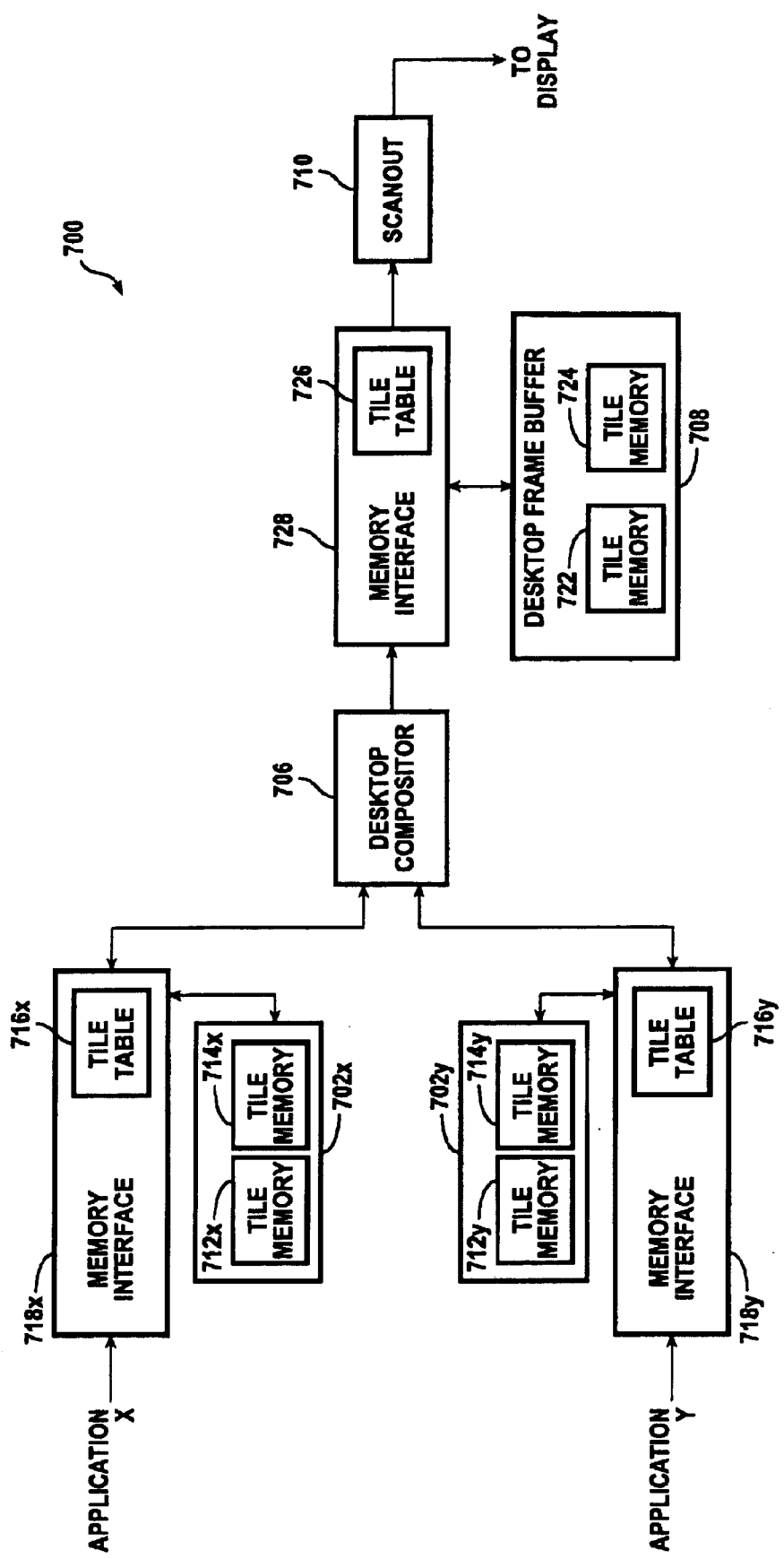
FIG. 7 is a block diagram of a desktop compositor system according to another embodiment of the present invention.

FIG. 7 is a block diagram of a desktop compositor system 700 for managing pixel data for multiple applications according to an embodiment of the present invention. A first application (X) has a double-buffered drawing memory area 702x, and a second application (Y) has a different double-buffered drawing memory area 702y. Drawing memory areas 702x, 702y are located "off-screen," meaning that these memory areas are not scanned out for display; memory areas 702x, 702y may be located within the graphics processing subsystem, in system main memory, or elsewhere as desired.

Drawing memory 702x (702y) is double buffered so that the application can write to one buffer while a desktop compositor module 706 reads from the other buffer. In accordance with the present invention, drawing memory 702x (702y) for application X (Y) includes two memory spaces 712x, 714x (712y, 714y); a memory interface 718x (718y) with a tile table 716x (716y) is also provided. Drawing memory 702x (702y) is accessed via memory interface 718x (718y) by reference to two logical drawing buffers. Memory interface 718x (718y) associates the logical buffers with the tile memories 702x, 704x (702y, 704y) according to entries in tile table 716x (716y). Memory interface 718x (718y) can be used to implement copy-on-write semantics, substantially as described above.

The desktop image is generated by a desktop compositor module 706 that writes pixel data to a double-buffered desktop frame buffer 708. In accordance with the present invention, desktop frame buffer 708 includes two memory spaces 722, 724; a desktop memory interface 728 with a tile table 726 is also provided. Desktop frame buffer 708 is accessed via memory interface 728 by reference to two logical desktop buffers. Memory interface 728 associates the logical buffers with tile locations in the memory spaces 722, 724 according to entries in tile table 726. Memory interface 728 can be used to implement copy-on-write semantics, substantially as described above.

In operation, application X (Y) writes tile data to one of the logical drawing buffers of its drawing memory 702x (702y) via memory interface 718x (718y), in accordance with process 500. In parallel, desktop compositor module 706 reads the other logical drawing buffer via memory interface 718x (718y). Desktop compositor module 706 generates the final desktop image from the applications' pixel data, together with other information about the screen configuration, such as the positioning and priority of each application's window(s), desired visual effects, and the like. For each tile of the desktop, desktop compositor 706 identifies one or more drawing buffers to provide data for the tile. Desktop compositor reads the selected drawing buffer(s) via memory interface(s) 718x (and/or 718y) and generates the desktop tile data.

In some instances, only one drawing buffer is used for a particular tile. In that case, desktop compositor can execute a conventional copy (e.g., block transfer) of data from the drawing buffer to the desktop frame buffer. In other instances, desktop compositor module 706 can modify the tile data or blend tile data provided by two or more applications and write the blended tile data to desktop frame buffer 708, thereby producing effects such as transparent or translucent windows. In either case, the tile data is written to one of the logical desktop buffers of desktop frame buffer 708 via memory interface 728.

In parallel with generation of a desktop image, scanout control logic 710 reads the other logical desktop buffer of desktop frame buffer 708 via memory interface 728 and provides display control signals to a display device.

It should be noted that desktop compositor module 706 is not limited to using tile data from the corresponding tile of the drawing buffer; that is, the data source for a tile i of the desktop can be any tile j from any application's drawing buffer. For instance, in some embodiments, an application always stores tile data starting in the first tile of its drawing buffer, regardless of where the application's window is positioned on the desktop display. Desktop compositor module 706 is provided with information about the window position for each application and uses that information to select an appropriate source tile for a particular tile of the desktop.

It will be appreciated that desktop compositor system 700 is illustrative and that variations or modifications are possible. For instance, although only two applications are shown, any number of applications can be supported, each with its own drawing memory area. Alternatively, multiple applications can share a drawing memory area. Drawing memory areas can be implemented using video memory or other memory devices, and the organization of tile data within the memory devices is a matter of design choice. The tile tables for the applications can be stored in the memory device, in registers of the CPU or graphics processing system, or elsewhere as desired. The desktop compositor module can be implemented in the CPU, a dedicated graphics processing unit (GPU), a dedicated desktop compositor chip, or elsewhere. The desktop compositor may also have access to other sources of tile data, such as a fixed background image for the desktop stored, e.g., in a separate location within system or graphics memory, graphical user interface elements (e.g., taskbar, desktop shortcut icons)

provided by an operating system, and so on. These other sources of tile data can be implemented in various ways, as is generally known in the art.

It will also be appreciated that various desktop compositor embodiments can be implemented in which some of the buffers are implemented using copy-on-write semantics while others are implemented conventionally. For example, some applications can use a conventional double-buffered (or single-buffered) drawing memory, while others can have drawing memories using copy-on-write semantics. The desktop compositor can use either a conventional desktop buffer (which may be double-buffered or single-buffered) or a desktop buffer using copy-on-write semantics.

As described above, embodiments of the present invention provide systems and methods for managing double-buffered tile data buffers using copy-on-write semantics. Transferring of tile data between memory locations is reduced to the extent that there are tiles that are not modified during a frame interval, resulting in a substantial reduction in memory bandwidth. For example, if each tile includes 16 pixels, with 32 bits of data per pixel, then implementing a two-bit tile table according to the present invention can reduce the memory bandwidth required to perform the copy operation at the end of each frame by a factor of 256 (16*32/2). Each time a tile is written, an additional one or two bits in the tile table are updated, adding a small amount of overhead that, in a wide variety of circumstances, does not outweigh the reduction in memory bandwidth obtained by not moving tile data at the end of each frame. The copy-on-write logic described herein can be implemented using hardware, software, or any combination thereof.

While the invention has been described with respect to specific embodiments, one skilled in the art will recognize that numerous modifications are possible. As described above, the tile table can be implemented in a number of ways, so long as an unambiguous association of logical buffers with memory locations on a tile-by-tile basis is provided. The invention is also not limited to the context of a frame buffer; the systems and methods described herein can be adapted to buffering tile data in drawing memories as well.

The number of tiles and/or the number of pixels per tile can be selected as desired, e.g., based on a page size of the graphics memory device(s). In an implementation with fewer pixels per tile, tile updates for a particular tile may be less frequent, but the size of the tile table is increased. In addition, small tile sizes could lead to inefficient use of memory bandwidth, e.g., if the tile size is smaller than the amount of pixel data that can be transferred in a single read or write transaction. Assigning the same number and arrangement of pixels to each tile can simplify the implementation but is not required. Where the graphics processing system implements tile-based rendering, a tile size corresponding to the size of a rendering tile may be advantageously chosen, but other tile sizes could also be used, and the present invention does not require the use of tile-based rendering.

Thus, although the invention has been described with respect to specific embodiments, it will be appreciated that the invention is intended to cover all modifications and equivalents within the scope of the following claims.

What is claimed is:

1. A buffer system for storing tile data for a plurality of tiles of a display, comprising:
   a first memory space for storing tile data;
   a second memory space for storing tile data;
   a tile table configured to store an entry for each of a plurality of tiles, each entry associating a tile of each of a first logical buffer and a second logical buffer with the same one or different ones of the first and second memory spaces; and
   a memory interface circuit configured to receive memory access commands referencing the first logical buffer and the second logical buffer, the memory interface circuit further configured to respond to the memory access commands by accessing the first and second memory spaces,
   wherein the memory interface circuit uses the tile table entries to determine and modify associations of tiles of the first and second logical buffers with the first and second memory spaces.

2. The buffer system of claim 1 wherein the memory interface circuit is further configured to respond to a command to read data for a tile of the first logical buffer by identifying from the tile table entry for the tile which of the first and second memory spaces is associated with the first logical buffer and accessing the identified memory space.

3. The buffer system of claim 1 wherein the memory interface circuit is further configured to respond to a command to copy a tile of the first logical buffer to the second logical buffer by modifying the tile table entry for the tile to associate the second logical buffer with the one of the first and second memory spaces associated with the first logical buffer, without accessing either of the first and second memory spaces.

4. The buffer system of claim 1 wherein the memory interface circuit is further configured to respond to a command to write data to a tile of the first logical buffer by modifying the tile table entry for the tile to associate the first and second logical buffers with different ones of the first and second memory spaces prior to writing the tile data to the one of the first and second memory spaces associated with the first logical buffer.

5. The buffer system of claim 1 wherein the memory interface circuit is implemented on a chip and the tile table includes a register array implemented on the chip.

6. The buffer system of claim 1 wherein each tile table entry includes a four-valued state indicator.

7. The buffer system of claim 6 wherein the state indicator includes:
   a first bit indicating which of the first and second memory spaces is associated with the first logical buffer; and
   a second bit indicating which of the first and second memory spaces is associated with the second logical buffer.

8. The buffer system of claim 6 wherein the state indicator includes:
   a first bit indicating which of the first and second memory spaces is associated with the first logical buffer; and
   a second bit indicating whether the second logical buffer is associated with the same one of the first and second memory spaces as the first buffer.

9. The buffer system of claim 1 wherein the first memory space and the second memory space are located in one or more random access memory (RAM) arrays.

10. A method for managing graphics data for a plurality of tiles of a display, the method comprising:
    establishing a tile association for each of the plurality of tiles, each tile association indicating which of two memory spaces for storing tile data for that tile is associated with each of a first logical buffer and a second logical buffer, wherein the two memory spaces are accessible by referencing the first logical buffer and the second logical buffer;

copying a tile of the first logical buffer to the second logical buffer by modifying the tile association for the tile such that the second logical buffer is associated with the one of the first and second memory spaces associated with the first logical buffer; and writing updated tile data for a tile of the second logical buffer to the one of the two memory spaces associated with the second logical buffer after updating the tile association for the tile so that the first and second logical buffers are associated with different ones of the two memory spaces.

11. The method of claim 10 wherein the act of writing updated tile data for a tile of the second logical buffer includes:

reading tile data for the tile from the memory space associated with the second logical buffer;

updating the tile data;

determining from the tile association for the tile whether the first logical buffer and the second logical buffer are both associated with a same one of the two memory spaces;

in response to determining that the first logical buffer and the second logical buffer are both associated with the same one of the two memory spaces, modifying the tile association for the tile to indicate that the second logical buffer is associated with the other one of the two memory spaces; and writing the updated data for the tile to the one of the two memory spaces associated with the second logical buffer.

12. The method of claim 10 wherein the act of copying a tile of the first logical buffer to the second logical buffer is performed for each of the plurality of tiles upon reaching the end of a scanout operation on the second logical buffer.

13. The method of claim 10 wherein the act of writing updated tile data for a tile is performed in response to a command received from an application executing on a central processing unit.

14. The method of claim 10 wherein the act of writing updated tile data for a tile is performed in response to a command received from a graphics processor.

15. The method of claim 10 wherein the act of establishing a tile association includes providing a tile table having an entry for each of the plurality of tiles.

16. The method of claim 15 wherein each tile table entry includes a four-valued state indicator.

17. The method of claim 16 wherein each state indicator includes:

a first bit indicating which of the two memory spaces is associated with the first logical buffer; and a second bit indicating which of the two memory spaces is associated with the second logical buffer.

18. The method of claim 16 wherein the state indicator includes:

a first bit indicating which of the two memory spaces is associated with the first logical buffer; and a second bit indicating whether the second logical buffer is associated with the same one of the two memory spaces as the first buffer.

19. A method for managing graphics data for a plurality of tiles of a display, the method comprising:

establishing a tile association for each of the plurality of tiles, each tile association indicating which of two memory spaces for storing tile data for that tile is associated with each of a first logical buffer and a second logical buffer, wherein the two memory spaces are accessible by referencing the first logical buffer and the second logical buffer;

scanning out data for each tile of a first display image from the one of the two memory spaces associated with the first logical buffer;

in parallel with the act of scanning out data, writing updated tile data for a tile of a second display image to the one of the two memory spaces associated with the second logical buffer after updating the tile association for the tile so that the first and second logical buffers are associated with different ones of the two memory spaces; and upon completion of the act of scanning out data, copying each tile of the second logical buffer to the first logical buffer by updating the tile associations such that the first logical buffer is associated with the one of the first and second memory spaces associated with the second logical buffer.

20. The method of claim 19 further comprising:

after copying the second logical buffer to the first logical buffer, scanning out data for each tile of the second display image from the one of the two memory spaces associated with the second logical buffer; and in parallel with the second act of scanning out data, writing updated tile data for a tile of a third display image to the one of the two memory spaces associated with the first logical buffer after updating the tile association for the tile so that the first and second logical buffers are associated with different ones of the two memory spaces.

21. The method of claim 19 wherein the act of writing updated tile data for a tile of a second display image includes:

reading tile data for the tile from the memory space associated with the second logical buffer;

updating the tile data for the tile;

determining from the tile association for the tile whether the first logical buffer and the second logical buffer are both associated with a same one of the two memory spaces;

in response to determining that the first logical buffer and the second logical buffer are both associated with the same one of the two memory spaces, modifying the tile association for the tile to indicate that the second logical buffer is associated with the other one of the two memory spaces; and writing the updated data for the tile to the one of the two memory spaces associated with the second logical buffer.

22. The method of claim 19 wherein the act of writing updated tile data is performed in response to a command received from an application executing on a central processing unit.

23. The method of claim 19 wherein the act of writing updated tile data is performed in response to a command received from a graphics processor.

24. The method of claim 19 wherein the act of writing updated tile data is performed in response to a command received from a desktop compositor.

25. The method of claim 19 wherein the act of establishing a tile association includes providing a tile table having an entry for each of the plurality of tiles.

26. The method of claim 25 wherein each tile table entry includes:

a first bit indicating which of the two memory spaces is associated with the first logical buffer; and a second bit indicating which of the two memory spaces is associated with the second logical buffer.

27. The method of claim 25 wherein each tile table entry includes:

a first bit indicating which of the two memory spaces is associated with the first logical buffer; and a second bit indicating whether the second logical buffer is associated with the same one of the two memory spaces as the first buffer.

28. A memory system for managing data for a plurality of tiles, comprising:

a plurality of drawing memories, each configured to receive source tile data for a plurality of tiles from a data source and to store the source tile data in one of a first and a second drawing buffer;

a desktop compositor module configured to read source tile data by accessing selected first drawing buffers of the drawing memories and to generate desktop tile data from the source tile data; and a desktop frame memory subsystem configured to store desktop tile data received from the desktop compositor module, the desktop frame memory subsystem including:

a first memory space for storing tile data;

a second memory space for storing tile data;

a tile table configured to store an entry for each of a plurality of tiles, each entry associating each of a first desktop buffer and a second desktop buffer with the same one or different ones of the first and second memory spaces; and a memory interface circuit configured to receive memory access commands referencing a the first desktop buffer and the second desktop buffer, the memory interface circuit further configured to respond to the memory access commands by accessing the first and second memory spaces, wherein the memory interface circuit uses the tile table entries to determine and modify associations of tiles of the first and second desktop buffers with the first and second memory spaces.

29. The memory system of claim 28 wherein the memory interface circuit of the desktop frame memory subsystem is implemented on a chip and the tile table includes a register array located on the chip.

30. The memory system of claim 28 wherein the first and second memory spaces of the desktop frame memory subsystem are located in a graphics memory device.

31. The memory system of claim 28, further comprising:

scanout control logic configured to read tile data from the desktop frame memory subsystem by referencing one of the first and second desktop buffers and to generate display control signals in response to the tile data.

32. The memory system of claim 28 wherein the desktop compositor module is further configured to generate desktop tile data by selecting a tile of one of the first drawing buffers as a tile data source.

33. The memory system of claim 28 wherein the desktop compositor module is further configured to generate desktop tile data by combining tile data from respective first drawing buffers of at least two of the drawing memories.

* * * * *

UNITED STATES PATENT AND TRADEMARK OFFICE
CERTIFICATE OF CORRECTION

PATENT NO. : 6,911,983 B2
DATED : June 28, 2005
INVENTOR(S) : Sabella et al.

It is certified that error appears in the above-identified patent and that said Letters Patent is hereby corrected as shown below:

<u>Title page,</u>
Item [75], Inventors, delete "Nicholas P. Witt" and insert -- Nicholas P. Wilt --.

Signed and Sealed this

Third Day of January, 2006

JON W. DUDAS
*Director of the United States Patent and Trademark Office*